United States Patent
Li et al.

(10) Patent No.: US 8,862,855 B2
(45) Date of Patent: Oct. 14, 2014

(54) READING/WRITING CONTROL METHOD AND SYSTEM FOR NONVOLATILE MEMORY STORAGE DEVICE

(75) Inventors: Zhixiong Li, Guangdong (CN); Enhua Deng, Guangdong (CN); Dan Guo, Guangdong (CN)

(73) Assignee: Shenzhen Netcom Electronics Co., Ltd., Guangdong (CN)

( * ) Notice: Subject to any disclaimer, the term of this patent is extended or adjusted under 35 U.S.C. 154(b) by 525 days.

(21) Appl. No.: 13/320,847

(22) PCT Filed: Jul. 19, 2010

(86) PCT No.: PCT/CN2010/075233
§ 371 (c)(1),
(2), (4) Date: Nov. 16, 2011

(87) PCT Pub. No.: WO2011/047563
PCT Pub. Date: Apr. 28, 2011

(65) Prior Publication Data
US 2012/0066443 A1     Mar. 15, 2012

(30) Foreign Application Priority Data

Oct. 23, 2009 (CN) .......................... 2009 1 0110589

(51) Int. Cl.
G06F 12/00   (2006.01)
G06F 12/02   (2006.01)

(52) U.S. Cl.
CPC .... G06F 12/0246 (2013.01); *G06F 2212/7203* (2013.01); *G06F 2212/7201* (2013.01)
USPC ........................... 711/202; 711/105; 711/173

(58) Field of Classification Search
USPC .......................................... 711/105, 173, 202
See application file for complete search history.

*Primary Examiner* — Gurtej Bansal
(74) *Attorney, Agent, or Firm* — Rosenberg, Klein & Lee

(57) ABSTRACT

The present invention is adapted to data storage technology field, and provides a reading/writing control method and system for nonvolatile memory, the method including the following steps: dividing valid blocks in the nonvolatile memory into different zones, the zones including at least one data zone having fixed number of valid blocks and one exchange zone having at least two valid blocks; creating a mapping table of logic blocks and physical blocks in each zone; establishing a mapping table of logic pages and physical pages in the blocks based on redundant area information of pages in the blocks, and storing the mapping table of the logic blocks and physical blocks in each zone and the mapping table of logic pages and physical pages in each block in a private data area; and writing data segments in an idle page of the blocks of the data zones in sequence, or reading data segments from valid pages in the data zones, thus the data reading/writing speed and efficiency is promoted.

12 Claims, 5 Drawing Sheets

READING/WRITING CONTROL METHOD AND SYSTEM FOR NONVOLATILE MEMORY STORAGE DEVICE

FIELD OF THE INVENTION

The present invention relates to data storage technology, more particularly, to a reading/writing control method and system for nonvolatile memory, a storage device.

BACKGROUND OF THE INVENTION

Nonvolatile memory NAND flash has been universally applied to mobile storage devices, for example, U disk, SD card, Solid State Disk and so on. The NAND flash can erase and program in memory unit block named Block. The write operation of any NAND flash device can only be performed in empty units or units erased to be empty, in order to guarantee the correctness of writing data, the erase operation must be executed before the write operation.

By now, when a segment of data needs to be written in the conventional file system based on NAND flash storage media, firstly, the system files should be modified frequently, for example, if a file is to be written in the FAT file system of the universally used Microsoft operation system, the FAT table and FDT table must be modified, and the modification should be performed multiple times before the content data of the file can be written in. Because of the intrinsic features of the NAND flash, a page in the Block cannot be reprogrammed before the whole Block is erased, however, valid data of the Block must be stored in new address (an empty Block) if the Block is to be erased.

FIG. 1 is a flow chart of an operating process of data writing of a NAND flash provided by the conventional technology, assuming that Block 1 and Block 2 are both Blocks of standard size in NAND flash, wherein Block 1 is a storage area with data and Block 2 is an empty area. If a data segment A (whose size is not bigger than that of a Block) needs to be written in a logic address zone A (the size of zone A is equal to the size of the data segment A), in the conventional NAND flash IC, while writing data from the start logic address of zone A, the operating process includes:

Step 1: finding a new empty Block 2, and copying data from Block 1 except zone A to respective position in Block 2.

Step 2: writing the data segment A ready to be written in zone A of Block 2.

Step 3: erasing Block 1.

In step 1, data from zone B of Block 1 is copied to zone B of Block 2, and data from zone C of Block 1 is copied to zone C of Block 2.

Such method will lead to frequent erasure of the area where system files are located, and bring the problem of low efficiency. Moreover, the wear of the NAND flash is large and it affects the service life of the storage.

According to the above steps and FIG. 1, while updating the data segments with logic address zone A in Block 1 according to the conventional technology, the cost time T without considering the time cost on outside transport port is:

$$T=T_R*(M-N)+T_W*(M-N)+T_W*N+T_D;$$

wherein M is the total number of pages in Block 1, N is the number of pages in data segment A, $T_R$ is the time cost in reading a page to RAM, $T_W$ is the programming time (writing time) from RAM to the page, $T_D$ is the time cost in erasing a Block, since $T_W$ is far larger than $T_R$, it is approximately considered that:

$$T \approx T_W M - T_W N + T_W N + T_D = T_W M + T_D;$$

so the efficiency ratio E of writing data segment A is:

$$E=\text{the time cost in writing data segment } A/T = T_W N/(T_W M+T_D);$$

The smaller the data segment A ready to be updated, the lower the efficiency. The abovementioned FAT table, FDT table, file content data are each a data segment A. By adopting the conventional technology, the operating time is long and the speed of saving files for the system is greatly lowered.

To sum up, the efficiency and speed of reading/writing data is low by using the conventional NAND flash.

SUMMARY OF THE INVENTION

It is an object of the present invention to provide a reading/writing control method and system for nonvolatile memory and a storage device.

A reading/writing control method for nonvolatile memory, including: dividing valid blocks in the nonvolatile memory into different zones, the zones including at least one data zone having fixed number of valid blocks and one exchange zone having at least two valid blocks; creating a mapping table of logic blocks and physical blocks in each zone; establishing a mapping table of logic pages and physical pages in the blocks based on redundant area information of pages in the blocks, and storing the mapping table of the logic blocks and physical blocks in each zone and the mapping table of logic pages and physical pages in each block in a private data area; and writing data segments in an idle page of the blocks of the data zones in sequence, or reading data segments from valid pages in the data zones.

In a preferred embodiment, further including steps after step of writing data segments in an idle page of blocks of the data zone or reading data segments from valid pages of the data zones: when writing new data segments in the nth block of data zone, if the nth block is written full, an empty block is applied for in the exchange zone, the new data segments are temporarily stored in the empty block of the exchange zone, wherein n is integer no less than 1.

In a preferred embodiment, further including steps after step of storing the new data segments temporarily in the empty block: when the empty block in the exchange zone is also written full, a replacement block is applied for in the exchange zone, and the valid data segments of the nth block and the exchange block corresponding to the nth block is copied and moved to the replacement block.

In a preferred embodiment, further including step after step of when the empty block in the exchange zone is also written full, a replacement block being applied for in the exchange zone, and the valid data segments of the nth block and the exchange block corresponding to the nth block being copied and moved to the replacement block: adding the nth block erased to be empty and the empty block of the exchange zone to the FIFO queue in the exchange zone.

In a preferred embodiment, further including: updating the mapping table of the logic blocks and physical blocks of the zone when any data block is copied and moved; updating the mapping table for the logic pages and physical pages in the block when new data segments are written in idle pages in the block.

In a preferred embodiment, wherein step of writing data segments in an idle page of the blocks of the data zones in sequence, or reading data segments from valid pages in the data zones comprises: computing the location of the data segment according to the offset address of the data segment; reading the mapping table of the logic blocks and physical blocks in the zones from the private data area; identifying the physical blocks needed to be read or written by inquiring the mapping table of the logic blocks and physical blocks; and writing the data segments in idle pages of the physical blocks in sequence, or reading the data segments from the valid pages of the identified physical blocks.

A reading/writing control system for nonvolatile memory, including: a zone dividing module for dividing valid blocks in the nonvolatile memory to different zones, the zones including at least one data zone having fixed number of valid blocks and one exchange zone including at least two valid blocks; a first mapping table creating module for creating a mapping table of logic blocks and physical blocks in each zone; a second mapping table creating module for creating the mapping table for the logic pages and physical pages in each block according to the redundant area information in the block; a storage module for storing the mapping tables for the logic blocks and physical blocks in each zone and for logic pages and physical pages in each block in a private data area; and a data segment read/write module for writing data segments in the blocks of the data zones in sequence, or reading data segments from valid pages in the data zones.

In a preferred embodiment, further including: a data segment temporary storing module for applying for an empty block in the exchange zone if the nth block is written full while writing new data segments in the nth block of data zone and for temporarily storing the new data segments in the empty block of the exchange zone; and a data segment copying and moving module for applying a replacement block in the exchange zone when the empty block is also written full and for copying and moving the valid data segment of the nth block and the exchange block corresponding to the nth block to the replacement block, wherein n is integer no less than 1.

In a preferred embodiment, the data segment read/write module including: a computing module for computing the location of the data segment according to the offset address of the data segment; a first mapping table reading module for reading the mapping table of the logic blocks and physical blocks in the zones from the private data area; a confirming module for identifying the physical blocks needed to be read or written by inquiring the mapping table of the logic blocks and physical blocks; a data writing module for writing the data segments in idle pages of the physical blocks in sequence; a data reading module for reading the data segments from the valid pages of the identified physical blocks.

In a preferred embodiment, further including: a updating module for updating the mapping table of the logic blocks and physical blocks of the zone or updating the mapping table for the logic pages and physical pages in the block; and a queue adding module for adding the nth block erased to be empty and the empty block of the exchange zone to the FIFO queue in the exchange zone.

A storage device, including a nonvolatile memory and a control unit, the control unit including: a zone dividing module for dividing valid blocks in the nonvolatile memory to different zones, the zones including at least one data zone having fixed number of valid blocks and one exchange zone including at least two valid blocks; a first mapping table creating module for creating a mapping table of logic blocks and physical blocks in each zone; a second mapping table creating module for creating the mapping table for the logic pages and physical pages in each block according to the redundant area information in the block; the nonvolatile memory including a private data area for storing the mapping table of the logic blocks and physical blocks in each zone created by the first mapping table creating module and for storing the mapping table of logic pages and physical pages in each block created by the second mapping table creating module; the control unit further including: a data reading/writing module for writing data segments in an idle page of the blocks of the data zones in sequence, or reading data segments from valid pages in the data zones.

A storage device, including a nonvolatile memory whose valid blocks are divided into different zones, the zones including at least one data zone having fixed number of valid blocks and one exchange zone having at least two valid blocks; the storage device including: a first mapping table creating module for creating a mapping table of logic blocks and physical blocks in each zone; a second mapping table creating module for creating the mapping table for the logic pages and physical pages in each block according to the redundant area information in the block; the nonvolatile storage including a private data area for storing the mapping table of the logic blocks and physical blocks in each data zone created by the first mapping table creating module and for storing the mapping table of logic pages and physical pages in each block in a private data area created by the second mapping table creating module.

In embodiments of the present invention, a fixed number of valid blocks in nonvolatile memory are divided into a data zone, and one of the zones is determined as an exchange zone, a mapping table of logic blocks and physical blocks in each zone is created, a mapping table of logic pages and physical pages in the blocks based on redundant area information of pages in the blocks is created, the mapping table of the logic blocks and physical blocks in each zone and the mapping table of logic pages and physical pages in each block are stored in a private data area, data segments are written in or read from an idle page of the blocks of the data zones, thus the read/write speed and efficiency are promoted.

DETAILED DESCRIPTION OF THE EMBODIMENTS

In embodiments of the present invention, the nonvolatile memory is divided to multiple data zones with each data zone including fixed number of valid Blocks, and one of the zones is designated to be an exchange zone. A mapping table of logic blocks and physical blocks in each data zone is created and a mapping table from logic pages to physical pages in each Block is created. The mapping tables for the logic blocks and physical blocks in each data zone and for logic pages and physical pages in each block are stored in a private data area. Data segments are read from or written in the blocks of the data zones.

Figure 1:
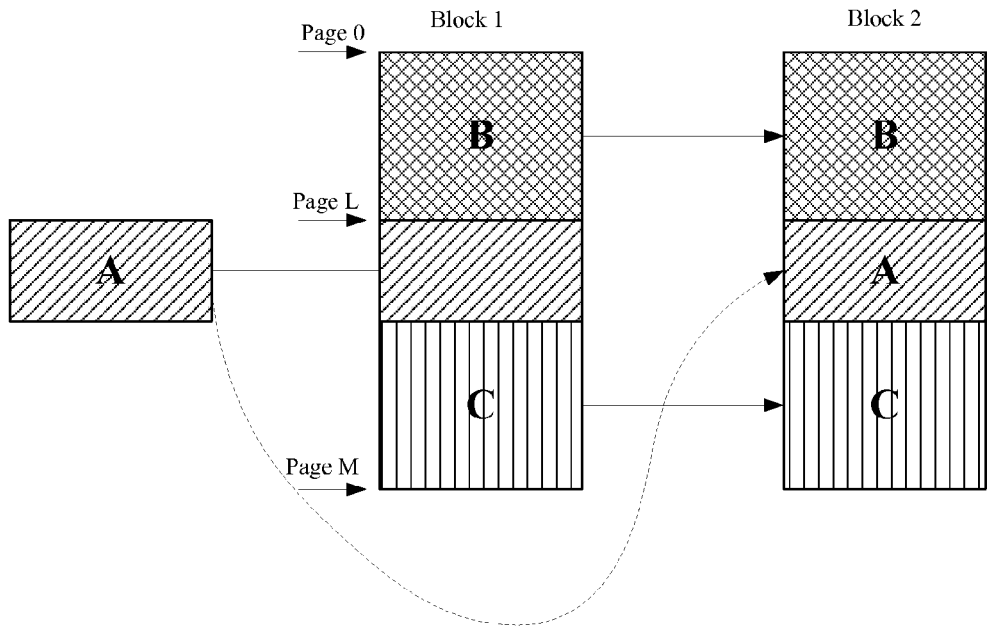
FIG. 1 is a flow chart of an operating process of data writing of a NAND flash provided by the conventional technology.
Figure 2:
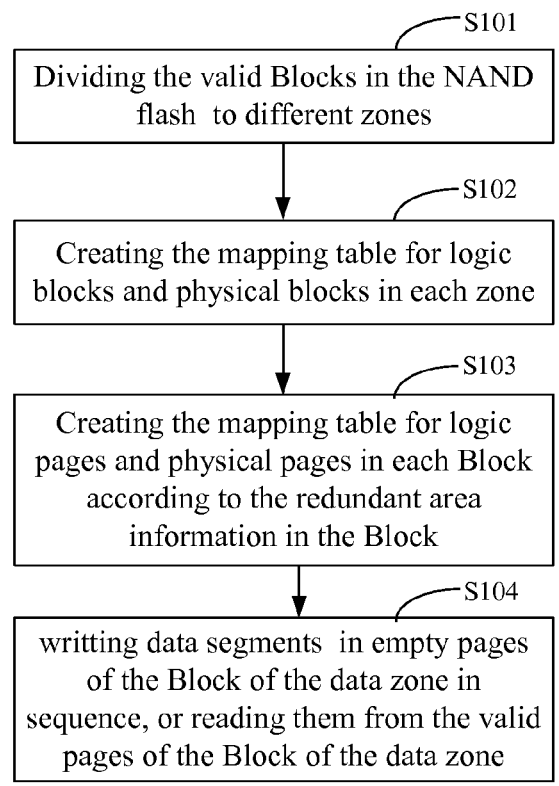
FIG. 2 is a flow chart of a read/write control method of nonvolatile memory provided by the first embodiment of the present invention.

FIG. 2 is a flow chart of a read/write control method of nonvolatile memory provided by the first embodiment of the present invention, the specified steps are described below:

In step 101, the valid Blocks in the nonvolatile memory (NAND flash) are divided to different zones; the zones include at least one data zone including fixed number of valid Blocks and one exchange zone including at least two valid Blocks.

In embodiments of the present invention, the zones include at least one data zone including fixed number of valid Blocks and one exchange zone including at least two valid Blocks. Each zone has a mapping table from the logic blocks to the physical blocks; the mapping table is stored in a private data area of the zones. The mapping table can be dynamically created accompanying with the zones dividing. After been used, the mapping table will be released from the RAM in order to provide memory space for creating a next mapping table from the logic blocks to the physical blocks.

In embodiments of the present invention, the private data area is located in the storage area grouped by all valid Blocks and is for storing codes, temporary data, exchange data, backup data, and configuration information and so on, all the private data areas are transparent to users and will not be taken account in the volume statistics of the data zones.

In embodiments of the present invention, the number of valid Blocks in the data zone is decided by RAM size of the NAND flash controller. Each data zone includes fixed number of valid Blocks, for example, each data zone includes 16 valid Blocks. The exchange zone includes at least two valid Blocks, bigger exchange zone profits global reading and writing balance but valid data storage zone in the NAND flash will become smaller accordingly. The exchange zone is used for storing exchange blocks and replacement blocks, the logic structure of the exchange zone is a first in first out (FIFO) queue.

In step 102, the mapping table for logic blocks and physical blocks in each zone is created.

In step 103, the mapping table for logic pages and physical pages in each Block is created according to the redundant area information in the Block, and then the mapping tables for logic blocks and physical blocks in each Zone and for logic pages and physical pages in each Block are stored in the private data area.

In embodiments of present invention, the mapping table for logic pages and physical pages in each Block is created according to the redundant area information in the Block when the Blocks in the zone are read or written.

In the above embodiment, the mapping table for logic pages and physical pages in each Block can also be created in advance and stored in a specified position of the Block, or dynamically created when the Blocks in the zone are read or written, which should not limit the present invention.

In embodiments of the present invention, by traversing the redundant area information of each page in each Block of the zone and appointing the first byte of the redundant area as the address of respective logic page, the mapping table for logic pages and physical pages in each Block is created. If there are logic pages with the same address, the bigger physical address stored in the logic address is considered as the valid physical address.

In step 104, data segments are written in empty pages of the Block of the data zone in sequence, or are read from the valid pages of the Block of the data zone.

In embodiments of the present invention, by writing data segments in empty pages of the Block of the data zone in sequence or reading data segments from the valid pages of the Block of the data zone, the read/write efficiency and speed is promoted.

Figure 3:
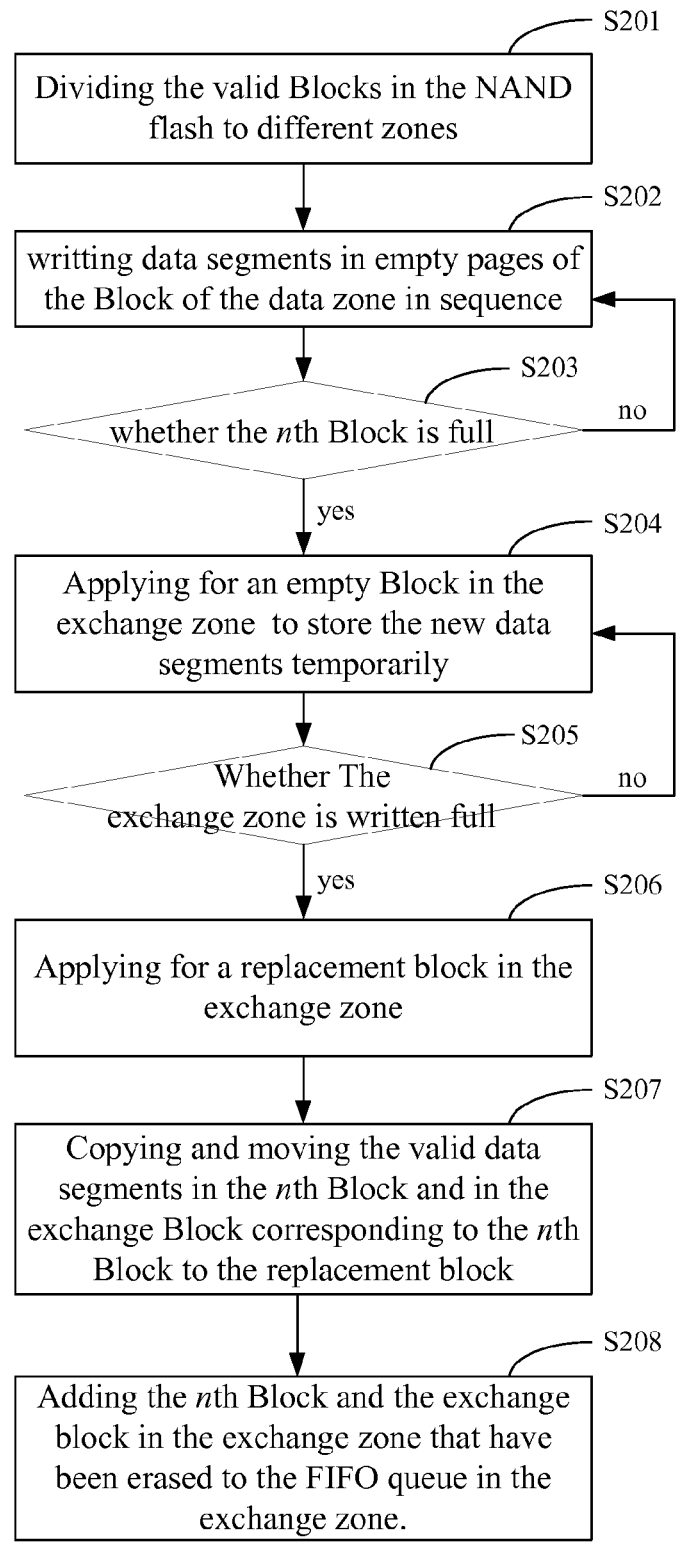
FIG. 3 shows a flow chart of a reading/writing control method of nonvolatile memory provided by the second embodiment of the present invention.

FIG. 3 shows a flow chart of a reading/writing control method of nonvolatile memory provided by the second embodiment of the present invention, the specified steps are described below:

In step 201, the valid Blocks in the NAND flash are divided to different zones.

In embodiments of the present invention, the dividing of zones includes the dividing of data zones and exchange zones, the creation of the mapping table for logic blocks and physical blocks in each zone and for logic pages and physical pages in each Block of each zone is also included. The dividing method is described detailed above and will not sum up here, which should not limit the present invention.

In step 202, data segments are written in empty pages of the Block of the data zone in sequence.

In embodiments of the present invention, data segments are written in the idle pages of the data zones according to the sequence of the idle pages. The operation process varies less, and detailed steps are described below and will not be summed up here, but it should not limit the present invention.

In step 203, while writing the nth new data segment in the data zone, judging if the nth Block is full, if yes, then step 204 should be executed, or else step 202 will be executed.

In embodiments of the present invention, the nth Block in the data zone is not a specified nth valid Block in the data zone but a general one which maybe the first Block or the nth Block, wherein n is an integer no less than 1, which should not limit the present invention.

In step 204, when the nth Block is written full, an empty Block in the exchange zone is applied for to store the new data segments temporarily.

In embodiments of the present invention, when the nth Block in a data zone is written full, an empty Block in the exchange zone is applied for, wherein the empty block is applied for according to the FIFO principle in the exchange zone. The nth new data segment ready to be written in a data zone is temporarily written in the empty Block applied from the exchange zone, the empty Block of the exchange zone is used for temporary storing data segments.

In embodiments of the present invention, the empty block in the exchange zones used to temporarily store data segments needs to update the mapping table for the logic pages and physical pages, and identifiers are used to indicate if the physical page corresponding to the logic page is located in the nth block or in the original empty block.

In embodiments of the present invention, the abovementioned process of storing the new data segment in the empty block of the exchanges zone temporarily is in fact a process of writing new data segments in idle pages of the empty block.

In step S205, judging if the empty block in the exchange zone is written full, if yes, then step S206 is executed, or else step S204 is executed.

In step S206, when the empty block in the exchange zone is also written full, then a replacement block is applied for in the exchange zone.

In embodiments of the present invention, when the empty block in the exchange zone is also written full, a second empty block is continued to applied for in the exchange zone, and the new data segments ready to be written in the nth block are stored in the second empty block, the specified flow is similar to the above steps and will not be summarized here.

When the empty blocks in the exchange zone are written full, a replacement block is applied for in the exchange zone, the replacement block is also empty.

In step S207, the valid data segments in the nth Block and in the exchange Block corresponding to the nth Block are copied and moved to the replacement block.

In embodiments of the present invention, after the approval of the replacement block, the valid data segments in the nth Block and in the exchange block corresponding to the nth Block in a data zone are copied and moved to the replacement block in the sequence of logic pages according to the mapping table for the logic pages and physical pages, the mapping table for the logic pages and physical pages in the valid data segment is updated at the same time.

When data copying and moving is finished, the mapping table for the logic pages and physical pages in the valid data segment is updated and the logic pointer of the valid data segment in the nth Block and in the exchange Block corresponding to the nth Block is pointed to the replacement block, and meanwhile the data segment in the nth Block and in the exchange block of the exchange zone is erased.

In step S208, the nth Block and the exchange block in the exchange zone that have been erased are added to the FIFO queue in the exchange zone.

Figure 4:
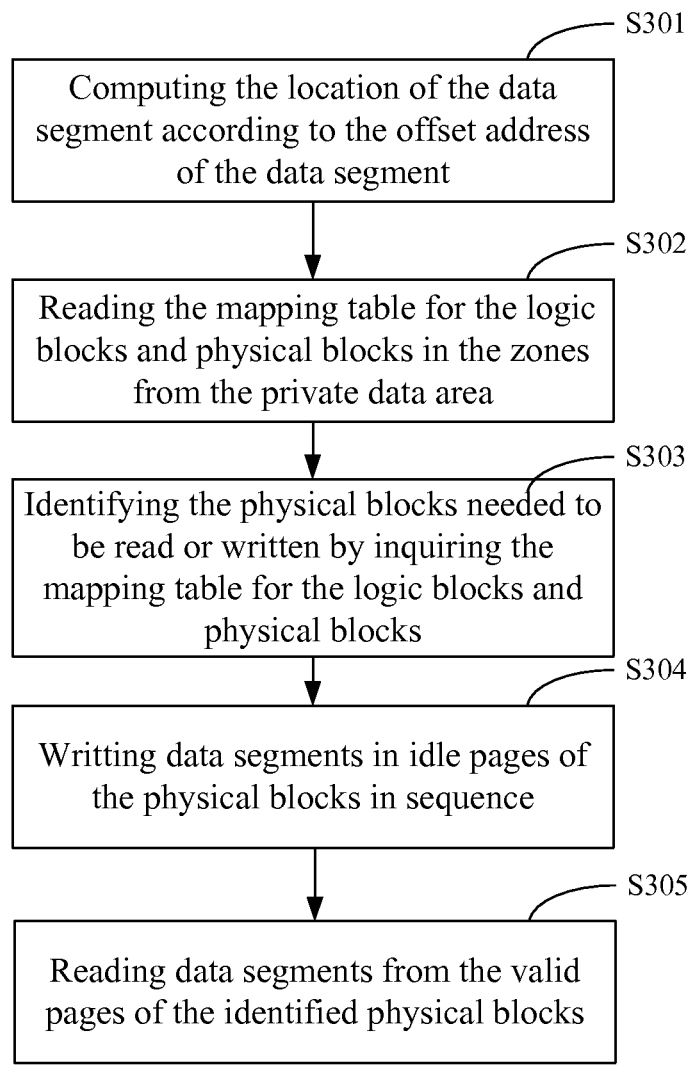
FIG. 4 shows a flow chart of reading data segments from or writing data segments in idle blocks of the zones provided by an embodiment of the present invention.

As an embodiment of the present invention, FIG. 4 shows a flow chart of reading data segments from or writing data segments in idle blocks of the zones provided by an embodiment of the present invention, the specified steps are described below:

In step S301, the location of the data segment is computed according to the offset address of the data segment.

In step S302, the mapping table for the logic blocks and physical blocks in the zones are read from the private data area.

In step S303, the physical blocks needed to be read or written are identified by inquiring the mapping table for the logic blocks and physical blocks.

In step S304, data segments are written in idle pages of the physical blocks in sequence.

In step S305, data segments are read from the valid pages of the identified physical blocks.

In embodiments of the present invention, when the data segments are read from or written in the blocks of the data zones, the mapping tables for the logic pages and physical pages of the blocks need to be updated.

Figure 5:
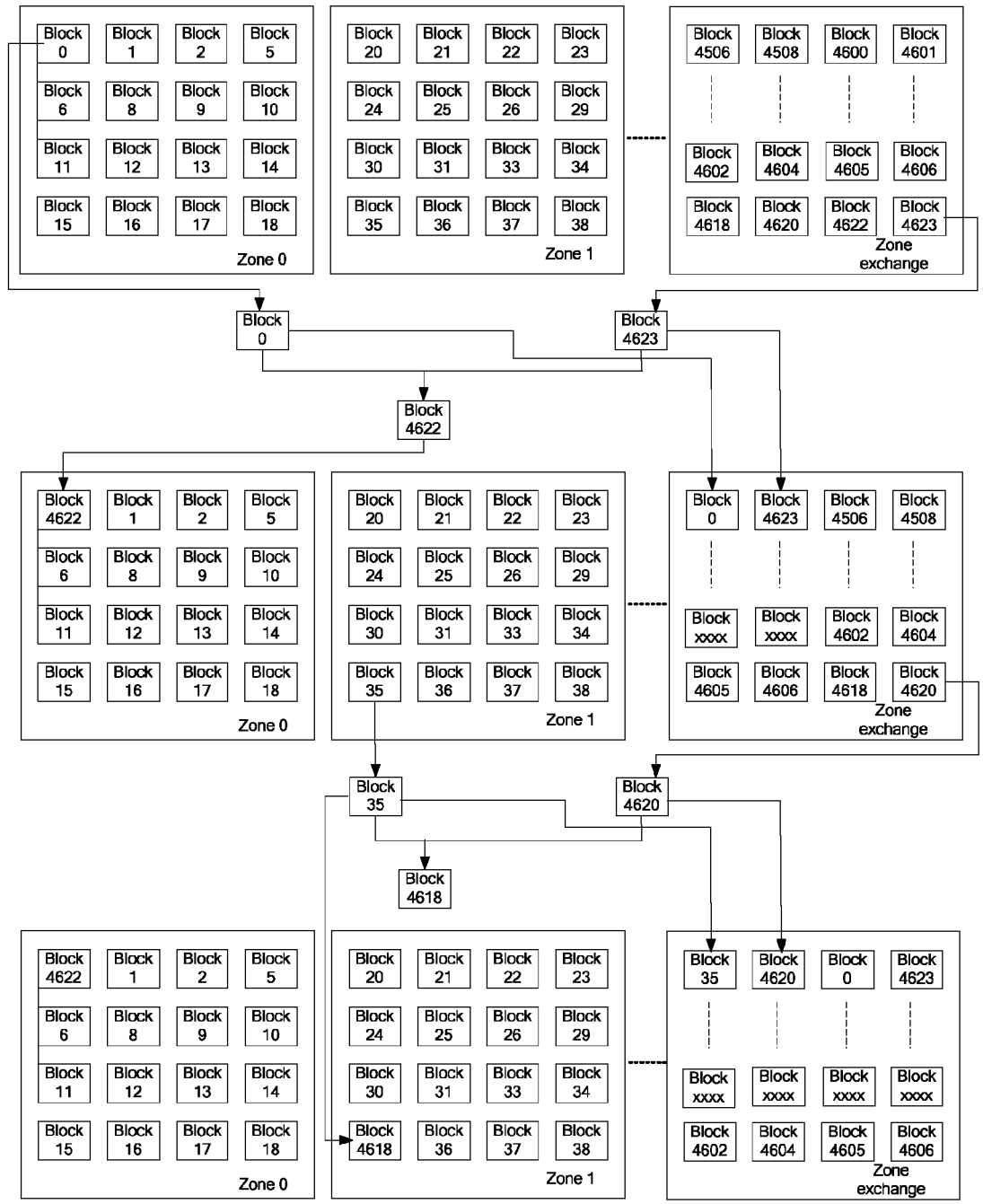
FIG. 5 shows a diagram of detailed realization of copying and moving the data segments of the nth block to the replacement block provided by an embodiment of the present invention.

As another embodiment of the present invention, FIG. 5 shows a diagram of detailed realization of copying and moving the data segments of the nth block to the replacement block provided by an embodiment of the present invention, the details are: the NAND flash is divided to multiple data zones with each data zone including 16 valid Blocks, the number of valid Blocks in the exchange zone is no less than 2, bigger number profits the global balance between reading and writing but the storage area in the NAND flash for storing valid data becomes smaller respectively.

The following zones are taken as examples to describe: Zone 0, Zone 1, . . . are data zones, Zone exchange is an exchange zone.

Assuming that a Block 0 located in Zone 0 is ready to be manipulated, because the blocks in Zone exchange are grouped as an FIFO queue, Block 4623 is an exchange block, Block 4622 is a replacement Block, after the copying and moving operation is executed, Block 0 is replaced by Block 4622 as a new valid Block in Zone 0, and Block 4623, Block 0 are erased and added to the FIFO queue in the Zone exchange.

The second exchange is for Block 35, after exchange and replacement, Block 4618 replaces Block 35 as a new valid Block in Zone 1, Block 4620, Block 35 are erased and added to the FIFO queue in the Zone exchange.

When data segments are read, the zone where the data segments are located can be computed according to the offset address of the data segments. The address of the physical block can be get from the mapping table for the logic blocks and physical blocks of zone where the logic block is located, then the redundant area information of each page is read to create the mapping table for the logic pages and the physical pages, and the physical page address of the data segment is identified by inquiring the table.

If the mapping table for the logic pages and physical pages of the block has already been stored in a fixed position, it can be read directly instead of recreating.

After multiple times of exchange and replacement, the physical blocks in all zones become discrete distributed, and the discrete distribution will become more even as the read/write times increase, such that a simple and effective reading and writing method of balancing the global wear is realized.

Without considering the time cost on outside transport and internal computing, the time T1 cost in copying S files with N pages by conventional technology is:

$$T1=(T_R(M-N)+T_W(M-N)+T_WN+T_D)\times S$$

The cost time T2 according to the method of the present invention is:

$$T2=T_WNS+T_P$$

wherein M is the total number of pages in all blocks, N is the number of pages in data segment A, $T_R$ is the time cost in reading a page to RAM, $T_W$ is the program time (writing time) from RAM to the page, $T_D$ is the time cost in erasing a Block, Tp represents the time needed in copying and moving data when the original block and exchange block are both written full, Tp is approximate $(T_RA+T_WA+2T_D)*(SN/2M)$, wherein A is the total number of valid pages in all blocks.

Because $T_R$ is more than one order of magnitude smaller than $T_W$, it is approximately considered that:

$$T1=(T_WM-T_WN+T_WN+T_D)S=T_WMS+T_DS$$

Comparing to T2 we can see that, the smaller the files, N is smaller, the smaller the data transportation time T2 and the higher the efficiency. Compared to T2, T1 has less correlation with N.

Moreover, by adopting the method to manage the NAND flash, while refreshing data, there is no need to frequently update the FAT table and FDT table, so that the time cost in updating the system files is reduced, and the speed of accessing small files for the system is greatly promoted. So the method provided by embodiments of the present invention has great privilege while copying a big amount of small files.

When big files are copied, because the address is continuous, there is no need to copy and move, TP is almost 0, and T2 is almost the same with T1. Because of the feature of file system, the FAT tables and FDT tables need to be frequently modified while copying big files, such modification are performed via writing small files, so the method provided by embodiments of the present invention also has efficiency privilege while copying big files comparing to prior art.

Figure 6:
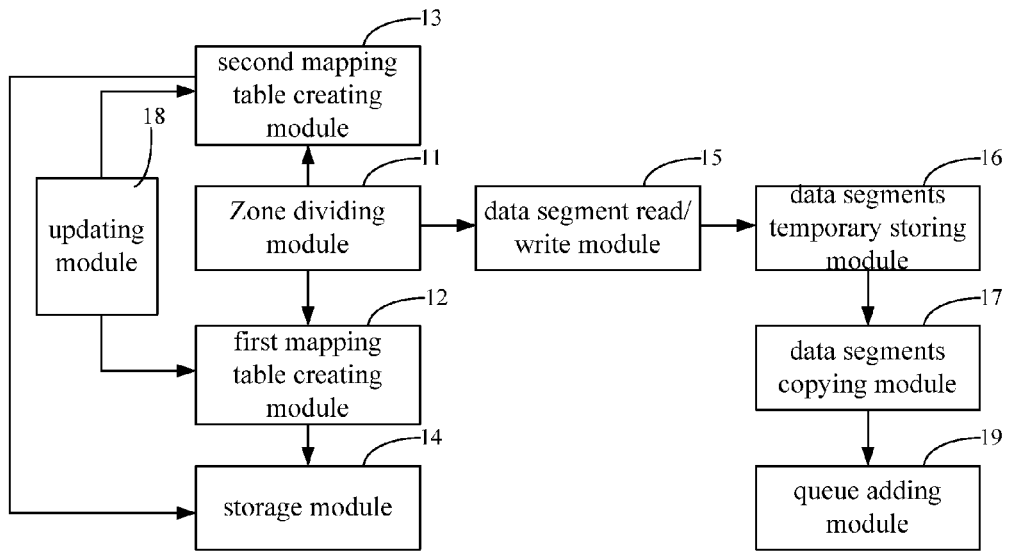
FIG. 6 shows a block diagram of a reading/writing control system for nonvolatile memory provided by embodiments of the present invention.

FIG. 6 shows a block diagram of a reading/writing control system for nonvolatile memory provided by embodiments of the present invention, for easy description, only the part related to the embodiments of the present invention is shown in the figure.

Zone dividing module 11 is used for dividing the valid Blocks in NAND flash to different zones, the zones include at least one data zone including fixed number of valid Blocks and one exchange zone including at least two valid Blocks. A first mapping table creating module 12 is used for creating the mapping table for the logic blocks and physical blocks in each zone. A second mapping table creating module 13 is used for creating the mapping table for the logic pages and physical pages in each block according to the redundant area information in the block. A storage module 14 is used for storing the mapping table for the logic blocks and physical blocks in each zone created by the first mapping table creating module 12 and the mapping table for the logic pages and physical pages in each block created by the second mapping table creating module 13 in the private data area. A data segment read/write module 15 is used for writing data segments in idle pages of Blocks in the data zones in sequence, or reading data segments from the valid pages in data zones.

In embodiments of the present invention, the number of valid blocks in data zones is determined by the RAM space of the NAND flash controller.

In embodiments of the present invention, if new data segments need to be written in the nth block of the data zone, if the nth block is full, A data segments temporary storing module 16 will apply an empty block to the exchange zone. If the empty block in the exchange zone is full, data segments copying module 17 will apply a replacement block to the exchange zone, copy and move the valid data segments in the nth block and exchange block corresponding to the nth block to the replacement block.

In embodiments of the present invention, when new data segments are written in idle pages of blocks, or there is copy and move operation on data segments, a updating module 18 will update the mapping tables for the logic blocks and physical blocks in the zones and the mapping tables for the logic pages and physical pages in the blocks.

In embodiments of the present invention, after the data segments copying module 17 applies for a replacement block to the exchange zone and copy and move the data segments in the nth block to the replacement block, a queue adding module 19 will add the nth block erased to be empty and the empty block in the exchange zone to the FIFO queue in the exchange zone.

Figure 7:
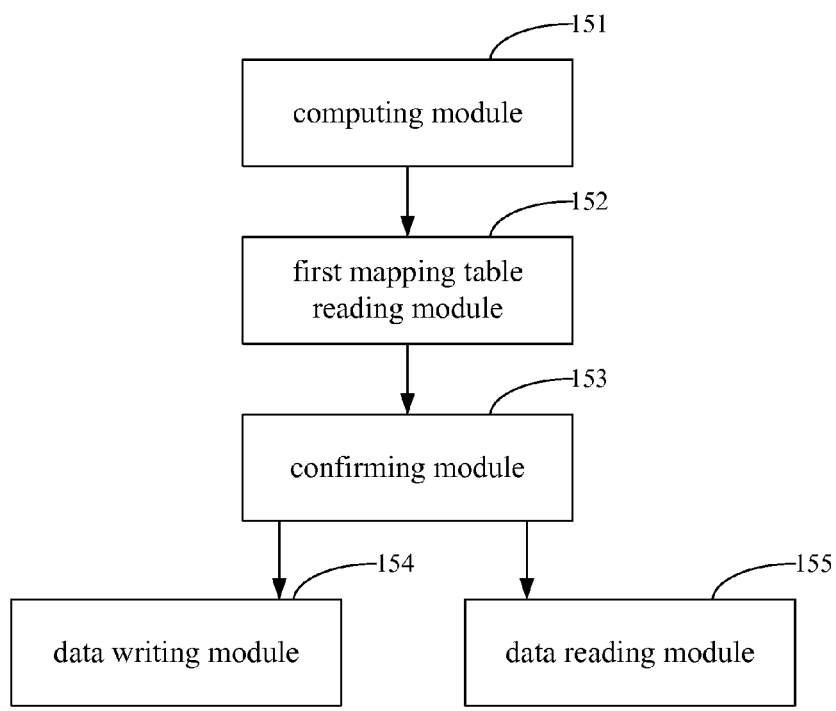
FIG. 7 shows a block diagram of a data segment read/write module for nonvolatile memory provided by embodiments of the present invention.

As an embodiment of the present invention, as FIG. 7 shows, computing module 151 computes the zone where the data segments are located according to the offset address of the data segments. A first mapping table reading module 152 reads the mapping table for the logic blocks and the physical blocks from the private data zone. A confirming module 153 inquires the mapping table for the logic blocks and physical blocks, determines the physical block for reading from or writing in data segments. A data writing module 154 writes data segments in idle pages of the determined physical blocks in sequence. A data reading module 155 reads data segments from the valid pages of the determined physical blocks.

In embodiments of the present invention, the NAND flash is divided to multiple data zones with each data zone including fixed number of valid blocks, one of the zones is designated as an exchange zone. A mapping table for logic blocks and physical blocks in each zone is created and a mapping table from logic pages to physical pages in each Block is created. The mapping tables from the logic blocks to physical blocks in each zone and from logic pages to physical pages in each Block are stored in private data area. Data segments are read from or written in the Blocks of the data zones. When a first block of the data zone is written full, an empty block in the exchange zone is applied for to write data in, and if the empty block in the exchange zone is written full too, a replacement block in the exchange zone is applied for to copy and move data. The reading/writing speed and efficiency is promoted, and mean while, by establishing the FIFO queue in the exchange zone, the blocks in different data zones are frequently exchanged in the process of data reading/writing, such that the global wear balance is realized.

In an embodiment of the present invention, the above reading/writing control system for nonvolatile memory is applied to a storage device, the storage device include nonvolatile memory and control unit, wherein the control unit includes the above zone dividing module, the first mapping table creating module, the second mapping table creating module, the data segment read/write module, the data segments tempo-rary storing module, the data segments copying module, the updating module and the queue adding module, the function is described above and will not be summarized here. In this embodiment, the nonvolatile memory includes a private data area for storing the mapping tables for the logic blocks and physical blocks in each zone and for logic pages and physical pages in each block.

In another embodiment of the present invention, valid blocks in the nonvolatile memory are divided to different zones, the zones including at least one data zone including fixed number of valid blocks and one exchange zone including at least two valid blocks. The storage device also includes the above first mapping table creating module and the second mapping table creating module, the nonvolatile memory includes a private data area for storing the mapping tables for the logic blocks and physical blocks in each zone created by the first mapping table creating module and the mapping tables for logic pages and physical pages in each block created by the second mapping table creating module.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A reading/writing control method for nonvolatile memory, comprising:
dividing valid blocks in the nonvolatile memory into different zones, the zones comprising at least one data zone having fixed number of valid blocks and one exchange zone having at least two valid blocks;
creating a mapping table of logic blocks and physical blocks in each zone;
establishing a mapping table of logic pages and physical pages in the blocks based on redundant area information of pages in the blocks, and storing the mapping table of the logic blocks and physical blocks in each zone and the mapping table of logic pages and physical pages in each block in a private data area; and
writing data segments in an idle page of the blocks of the data zones in sequence, or reading data segments from valid pages in the data zones.

2. The reading/writing control method for nonvolatile memory of claim 1, wherein step of writing data segments in an idle page of the blocks of the data zones in sequence, or reading data segments from valid pages in the data zones comprises:
computing the location of the data segment according to the offset address of the data segment;
reading the mapping table of the logic blocks and physical blocks in the zones from the private data zone;

identifying the physical blocks needed to be read or written by inquiring the mapping table of the logic blocks and physical blocks;

and writing the data segments in idle pages of the physical blocks in sequence, or reading the data segments from the valid pages of the identified physical blocks.

3. The reading/writing control method for nonvolatile memory of claim 1, further comprising steps after step of writing data segments in an idle page of blocks of the data zone or reading data segments from valid pages of the data zones:

when writing new data segments in the nth block of data zone, if the nth block is written full, an empty block is applied for in the exchange zone, the new data segments are temporarily stored in the empty block of the exchange zone, wherein n is integer no less than 1.

4. The reading/writing control method for nonvolatile memory of claim 3, further comprising steps after step of storing the new data segments temporarily in the empty block:

when the empty block in the exchange zone is also written full, a replacement block is applied for, and the valid data segments of the nth block and the exchange block corresponding to the nth block is copied and moved to the replacement block.

5. The reading/writing control method for nonvolatile memory of claim 4, further comprising step after step of when the empty block in the exchange zone is also written full, a replacement block being applied for, and the valid data segments of the nth block and the exchange block corresponding to the nth block being copied and moved to the replacement block:

adding the nth block erased to be empty and the empty block of the exchange zone to the FIFO queue in the exchange zone.

6. The reading/writing control method for nonvolatile memory of claim 4, further comprising:

updating the mapping table of the logic blocks and physical blocks of the zone when any data block is copied and moved;

updating the mapping table for the logic pages and physical pages in the block when new data segments are written in idle pages in the block.

7. A reading/writing control system for nonvolatile memory, comprising:

a zone dividing module for dividing valid blocks in the nonvolatile memory to different zones, the zones comprising at least one data zone including fixed number of valid blocks and one exchange zone including at least two valid blocks;

a first mapping table creating module for creating a mapping table of logic blocks and physical blocks in each zone;

a second mapping table creating module for creating the mapping table for the logic pages and physical pages in each block according to the redundant area information in the block;

a storage module for storing the mapping tables for the logic blocks and physical blocks in each zone and for logic pages and physical pages in each block in a private data zone; and a data segment read/write module for writing data segments in the blocks of the data zones in sequence, or reading data segments from valid pages in the data zones.

8. The reading/writing control system for nonvolatile memory of claim 7, further comprising:

a data segment temporary storing module for applying for an empty block in the exchange zone if the nth block is written full while writing new data segments in the nth block of data zone and for temporarily storing the new data segments in the empty block of the exchange zone; and a data segment copying and moving module for applying a replacement block in the exchange zone when the empty block is also written full and for copying and moving the valid data segment of the nth block and the exchange block corresponding to the nth block to the replacement block, wherein n is integer no less than 1.

9. The reading/writing control system for nonvolatile memory of claim 8, the data segment read/write module comprising:

a computing module for computing the location of the data segment according to the offset address of the data segment;

a first mapping table reading module for reading the mapping table of the logic blocks and physical blocks in the zones from the private data zone;

a confirming module for identifying the physical blocks needed to be read or written by inquiring the mapping table of the logic blocks and physical blocks;

a data writing module for writing the data segments in idle pages of the physical blocks in sequence;

a data reading module for reading the data segments from the valid pages of the identified physical blocks.

10. The reading/writing control system for nonvolatile memory of claim 8, further comprising:

a updating module for updating the mapping table of the logic blocks and physical blocks of the zone or updating the mapping table for the logic pages and physical pages in the block; and a queue adding module for adding the nth block erased to be empty and the empty block of the exchange zone to the FIFO queue in the exchange zone.

11. A storage device, comprising a nonvolatile memory and a control unit, the control unit comprising:

a zone dividing module for dividing valid blocks in the nonvolatile memory to different zones, the zones comprising at least one data zone including fixed number of valid blocks and one exchange zone including at least two valid blocks;

a first mapping table creating module for creating a mapping table of logic blocks and physical blocks in each zone;

a second mapping table creating module for creating the mapping table for the logic pages and physical pages in each block according to the redundant area information in the block;

the nonvolatile memory comprising a private data area for storing the mapping table of the logic blocks and physical blocks in each data zone created by the first mapping table creating module and for storing the mapping table of logic pages and physical pages in each block in a private data area created by the second mapping table creating module;

the control unit further comprising: a data reading/writing module for writing data segments in an idle page of the blocks of the data zones in sequence, or reading data segments from valid pages in the data zones.

12. A storage device, comprising a nonvolatile memory whose valid blocks are divided into different zones, the zones comprising at least one data zone having fixed number of valid blocks and one exchange zone having at least two valid blocks;

the storage device comprising: a first mapping table creating module for creating a mapping table of logic blocks and physical blocks in each zone;

a second mapping table creating module for creating the mapping table for the logic pages and physical pages in each block according to the redundant area information in the block;

the nonvolatile memory comprising a private data area for storing the mapping table of the logic blocks and physical blocks in each zone created by the first mapping table creating module and for storing the mapping table of logic pages and physical pages in each block in a private data area created by the second mapping table creating module.

\* \* \* \* \*